US012686062B2

(12) United States Patent
Maier et al.

(10) Patent No.: US 12,686,062 B2
(45) Date of Patent: Jul. 21, 2026

(54) TOOL CUTTING EDGE ADJUSTING HEAD, METHOD OF OPERATING SAME AND CORRECTING TOOL CUTTING EDGE WEAR

(71) Applicant: BLUM-NOVOTEST GMBH, Gruenkraut (DE)

(72) Inventors: Gregor Maier, Wolpertswende (DE); Christian Harscher, Bad Wurzach-Seibranz (DE); Thomas Vujica, Baienfurt (DE); Michael Renz, Besigheim (DE); Martin Boos, Schlier (DE)

(73) Assignee: BLUM-NOVOTEST GMBH, Gruenkraut (DE)

( * ) Notice: Subject to any disclaimer, the term of this patent is extended or adjusted under 35 U.S.C. 154(b) by 1047 days.

(21) Appl. No.: 17/642,226

(22) PCT Filed: Sep. 1, 2020

(86) PCT No.: PCT/EP2020/074261
§ 371 (c)(1),
(2) Date: Mar. 10, 2022

(87) PCT Pub. No.: WO2021/047940
PCT Pub. Date: Mar. 18, 2021

(65) Prior Publication Data
US 2022/0314336 A1     Oct. 6, 2022

(30) Foreign Application Priority Data
Sep. 11, 2019     (DE) ..................... 10 2019 006 466.6

(51) Int. Cl.
*B23B 29/034* (2006.01)
*B23Q 1/00* (2006.01)
*B23Q 17/20* (2006.01)

(52) U.S. Cl.
CPC ...... *B23B 29/03492* (2013.01); *B23Q 1/0009* (2013.01); *B23Q 17/20* (2013.01); *B23B 2260/128* (2013.01)

(58) Field of Classification Search
CPC .............................. B23Q 17/22; B23B 29/034
See application file for complete search history.

(56) References Cited

U.S. PATENT DOCUMENTS 4,933,868 A * 6/1990 McMurtry ......... G05B 19/4166
                                                           408/173
2018/0290216 A1* 10/2018 Park .................. B23B 29/03485

FOREIGN PATENT DOCUMENTS

DE          4025932 A1    3/1991
DE     102008017349 A1 * 10/2009    ........... B23Q 1/0009
(Continued)

OTHER PUBLICATIONS

English translation of DE 102008017349 (Year: 2008).*
(Continued)

*Primary Examiner* — Alan Snyder
(74) *Attorney, Agent, or Firm* — Tarolli, Sundheim, Covell & Tummino LLP

(57) ABSTRACT

The adjustment head is intended for use in the working space of a CNC machine which has a base station set up and intended for the exchange of information with a measuring probe or bore measuring mandrel, which base station is connected to a control of the CNC machine, and comprises a first function module and a second function module, wherein the first function module is divided into a power supply module and a data transmission module, wherein the second function module comprises a machining module for receiving at least one tool, wherein the machining module comprises a tool adjustment device for adjustment the tool in a radial and/or an axial direction and/or in an angular orientation of the tool based on specifications of the control, (Continued)

and wherein the power supply module supplies components of the adjustment head, including the data transmission module and the tool adjustment device, with electrical power, and wherein the data transmission module is arranged and intended for exchanging information concerning at least the adjustment of tool accommodated in the adjustment head with the base station of the measuring probe or bore gauge in the working space of the CNC machine.

13 Claims, 1 Drawing Sheet

(56) References Cited

FOREIGN PATENT DOCUMENTS

| | | | |
|---|---|---|---|
| DE | 102010003338 | A1 | 9/2011 |
| DE | 102013217911 | A1 | 3/2015 |
| EP | 0753367 | A2 | 1/1997 |
| EP | 2095897 | A1 | 9/2009 |
| EP | 2799169 | A2 | 11/2014 |
| WO | 8803672 | A1 | 5/1988 |
| WO | 9607500 | A1 | 3/1996 |
| WO | 97/41988 | A1 | 11/1997 |

OTHER PUBLICATIONS

International Search Report issued in connection with corresponding patent application No. PCT/EP2020/074261 dated Nov. 13, 2020.
Search Report issued in connection with German Patent Application No. 10 2019 006 466.6 dated May 20, 2020.
MicroKom BluFlex 2—Operating Instructions.
Feindrehkopf M42 "Die zukunftweisende Feinbearbeitung mit direktem Meßsystem und Infrarot-Datenübertragung".
Gerhard Scheer, "Bohrungen auf Bearbeitungszentren meßgeregelt feinbearbeiten", Werkstatt und Betrieb, 125 Jahrgang May 1992.
DE Office Action for corresponding DE Patent Application No. 10 2019 006 466.6, dated Oct. 15, 2025, 30 pages.

* cited by examiner

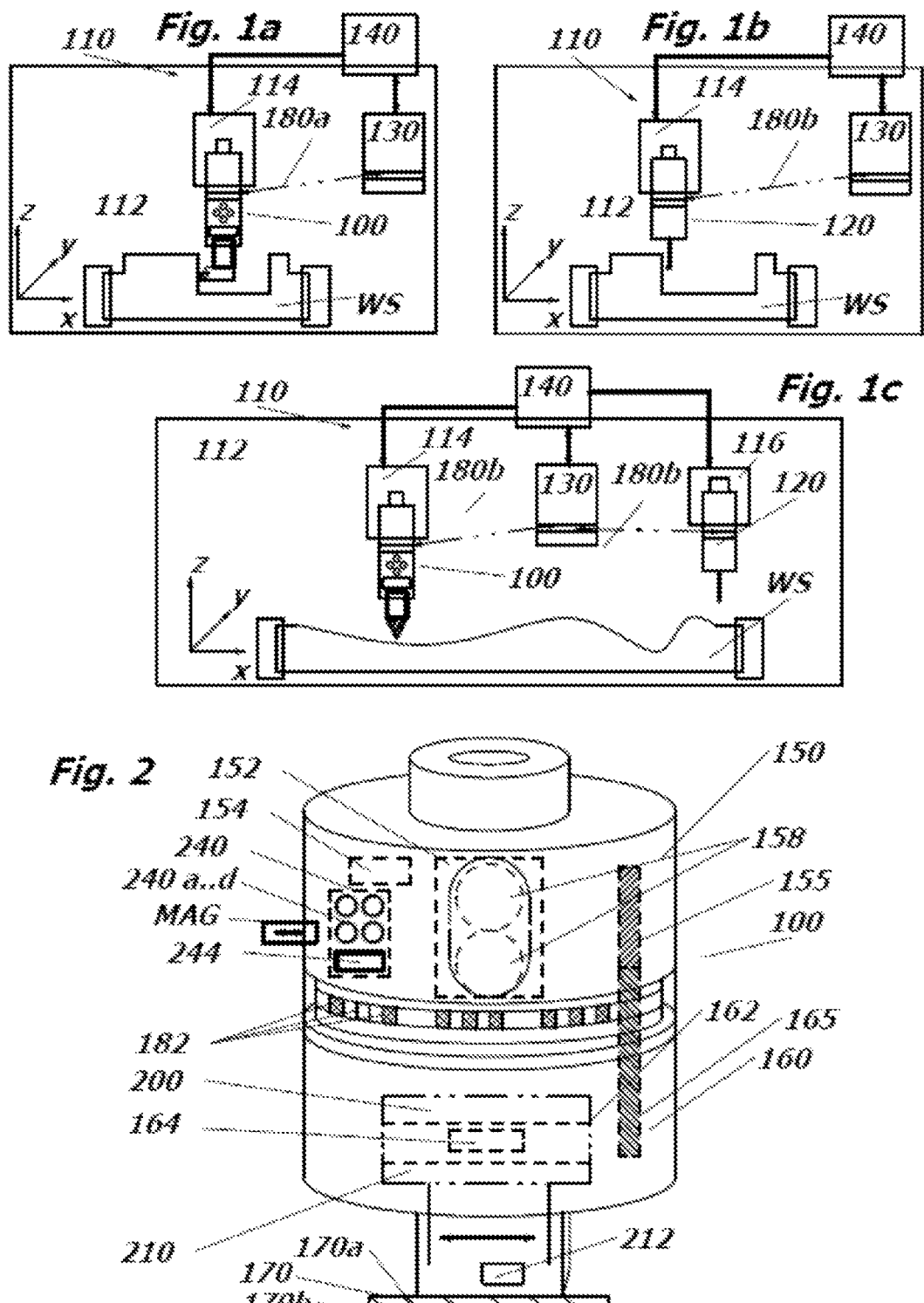

TOOL CUTTING EDGE ADJUSTING HEAD, METHOD OF OPERATING SAME AND CORRECTING TOOL CUTTING EDGE WEAR

RELATED APPLICATIONS

The present invention is a U.S. National Stage under 35 USC 371 patent application, claiming priority to Serial No. PCT/EP2020/074261, filed on Sep. 1, 2020; which claims priority from German Patent Application No. 10 2019 006 466.6 filed on Sep. 11, 2019; the entirety of both are hereby incorporated herein by reference.

INTRODUCTION

Disclosed herein are a tool cutting edge adjustment head and a method for operating it and for correcting tool cutting edge wear. In addition, the corresponding device components such as the tool cutting edge adjustment head and a corresponding—transmitter/receiver for communication with an NC control, for example of a machine tool, are explained. A tool cutting edge adjustment head is also referred to as an actuating tool. Details of this are defined in the claims; however, the description also contains relevant information on the structure and mode of operation as well as variants of the method and the system or device components.

BACKGROUND, STATE OF THE ART

In machining centres, one or more spindles are used to machine a workpiece. A machining centre is a machine tool equipped for automated operation with a CNC control for complete machining of (metal, wood or plastic) workpieces. A tool or a workpiece may be—mounted in each of the spindles; the spindles may be fixed in position or moved and driven, for example, in three orthogonal directions X, Y, Z within a working space of the machining centre. Machining centres usually have an automatic tool and workpiece changer which—prompted by the CNC control—can insert and exchange a measuring probe into the respective spindle in order to also measure the workpiece machined with this spindle. The measuring probe communicates with the CNC control for this purpose. During machining, tool cutting edges are subject to continuous wear. This wear can be compensated for within limits by correcting the feed of the tool to the workpiece. For milling and turning operations, the wear can be offset in the CNC control with the tool data stored in the CNC control. During the machining of the workpiece, the wear of the tool is then compensated with activated compensation of the tool radius.

With drilling and boring tools, the wear of the tool can only be compensated by adjustment the cutting edge. With most tools of this type, the adjustment is done manually by the machine operator inside or outside the machine. Other tools have motorised adjustment. These include, for example, the Komet-042 fine adjustment head, which integrates a direct measuring system on the adjustment slide, a servo gear motor and infrared transmitting and receiving electronics, with the external power supply being contactless. Usually, manual intervention in the production process is required for fine machining of bores in order to achieve tolerances in the micrometre range by measuring and correcting.

The Komet-042 fine adjustment head allows to measure and correct in an automated overall process. The Komet-042 fine adjustment head allows the cutting edge to be adjusted in μm steps in a closed control loop. For this purpose, the Komet-042 fine adjustment head is controlled by an external measuring computer.

Another solution is the KOMET KomTronic® U-axis system, an automatically interchangeable tool system. This arrangement allows turning, back turning, chamfering and the creation of CNC-controlled contours on workpieces. Different internal and external contours can be produced in one operation in conjunction with attachment tools and indexable inserts, even on non-rotationally symmetrical components.

Furthermore, contactless or tactile measuring probes are known which communicate with the CNC-controlled machine tool in order to scan a surface, an edge or a tip of a tool or workpiece in a machine room (machining room). For each detected feature, the contact/non-contact probe signals corresponding measurement data to the CNC machine control, which may include a computer program. Together with machine position data from the CNC control, the tactile probe data allows the numerical control to determine an accurate picture of the dimensions of the tool or workpiece.

DE 2010200 A relates to a tool holding device in which the tool is mounted on a carriage which is radially displaceable relative to a body rotatably mounted on a machine tool by the latter. A multi-phase stepper motor is mounted on a body and arranged to produce relative radial movement. The shaft of the stepper motor is coaxial with the axis of rotation of the body. Attached to the shaft is a worm screw coupled to a worm wheel connected to the central part of a second shaft between a cylindrical part supported by one or more bearings and a threaded part coupled to a nut attached to the carriage.

EP 491 724 B1 and EP 719 195 B1 contain further technological background. A tool head shown there for use in machine tools has a base body rotating about an axis of rotation. A slider which is adjustable relative to the base body transversely to the axis of rotation can be equipped with a cutting tool. Furthermore, a measuring device for the adjustment path of the slider relative to the base body and a device for evaluating and displaying the path measurement results are provided.

In order to be able to adjust the position of the cutting tool, it is known from DE-OS 35 26 712 to measure the adjustment path of the slider relative to the housing in a direct way by optical scanning. The reading of the displacement measurement results requires a stationary installation. The use of the tool head is limited to machine tools containing this installation.

The known solutions use infrared light as the transmission medium for data transfer (for example, the fine adjustment head M042). For this purpose, an infrared transmitter/receiver module is installed in the working area of the CNC machine, which communicates with the respective fine adjustment head. A bidirectional data line leads from this transmitter/receiver module to a control unit. The KOMET MicroKom BluFlex®2 fine adjustment head with integrated display and Bluetooth® technology allows data transmission to a mobile device (smartphone, tablet, etc.), but there are no provisions in the CNC machine for a direct connection to this fine adjustment head via Bluetooth®. With the fine adjustment head M042, the adjustment of the slider of the cutting tool is possible by an integrated servo motor and the control and operation via a bidirectional infrared interface. This means that the fine adjustment head can also be adjusted in the spindle. The slider position is detected by the measuring system. The adjustment is carried out with an external operating device. The data exchange and the energy supply take place via permanently installed connections through the spindle.

The MicroKom BluFlex®2 fine adjustment head is intended exclusively for boring and overturning. The MicroKom BluFlex® 2 fine adjustment head may only be installed and operated in machine tools designed for this purpose. Permissible speeds of the fine adjustment head depend on the tool used (mass & type) and the slide control. The speeds must be adapted according to the machining and its conditions.

The known tool cutting fine adjustment heads have a housing with a cut-off point (ABS®32, ABS®50) on the one hand and a tool interface on the other (for example ABS®32, ABS®50 or a receptacle for boring bars with cylindrical shank according to DIN 1835-A, etc.). The other components (interface for power and data, infrared transmit/receive module, presetting device, servomotor, etc.) are also housed in the housing. For communication, a dedicated infrared or Bluetooth® transmit/receive module is required in the machine room, which requires space, has to be mounted and connected to the control system.

From EP 0 907 444 A1, a tool head for use in machine tools is known, with a base body, a tool shank which projects axially beyond the base body and can be coupled to a machine spindle, with a working slide which is adjustable transversely to the base body axis and has a tool holder on the end face, and with an adjustment motor arranged in the base body. Gear means in the base body have an output shaft with a drive pinion that can rotate concentrically to the base body axis. A gear on the working slide side meshes with the drive pinion and is arranged on an intermediate gear element guided in the main body, which is coupled to the working slide. The variable displacement motor and the gear are at least partially radially and axially nested. A slide assembly for receiving the working slide and, if necessary, a compensating slide, a drive assembly for receiving the variable displacement motor and the gear and a connection assembly comprising the tool shank are detachably connected to each other at axial separation points.

The slide assembly contains a measuring device for directly measuring the displacement of the working slide relative to the base body. The slider assembly and/or the drive assembly contains measurement and control electronics connected to the measuring device for controlling the adjustment motor. The connection assembly contains an interface for an inductive power supply and data transmission. The housing of the variable displacement motor is arranged in a recess of the base body concentric to the base body axis, leaving a gap for the motor cooling which can be supplied with a coolant. The power supply interface is located in a housing to which a coolant can be applied on the outside via a gap. The drive assembly with an axially projecting bearing sleeve for the output shaft engages in an axially open recess of the slider assembly. The bearing sleeve engages in an elongated hole of the compensating slide. The gear plate on the working slide side or the drive pinion are divided into two axially separate toothed parts that can be displaced or rotated relative to each other and rigidly connected to each other. The working slide has a radial bore connected to the—tool holder and aligned parallel to the direction of adjustment for connection to a coolant line fixed to the main body. The coolant line, which is fixed to the base body, has a plug-in tube that engages in the radial bore in a sliding and liquid-tight manner. The slide assembly has a jacket pipe clamped to the base body via a cover part. The base body has an interface for a galvanic power supply and data transmission in the area of the slide assembly.

Underlying Problem

Based on this, a tool head of the type described above should be universally applicable and inexpensive to purchase and operate, as well as being low-fault.

Presented Solution

To this end, the combination of features indicated in claim 1 is proposed. Further advantageous embodiments and further improvements are defined in the dependent claims and discussed below.

The solution presented is based, among other things, on the realisation that measuring probes of the type mentioned above are often used in machining centres or other CNC machines, which communicate with the CNC control or a measuring PC via a wireless light or radio connection.

The adjustment head proposed here is intended and set up for use in the working space of a CNC machine which has a base station set up and intended for the exchange of information with a measuring probe or bore measuring mandrel, which base station is connected to a control of the CNC machine, and comprises a first function module and a second function module, wherein the first function module is divided into a power supply module and a data transmission module, wherein the second function module comprises a machining module for receiving at least one tool, wherein the machining module comprises a tool adjustment device for adjustment the tool in a radial and/or an axial direction and/or in an angular orientation of the tool based on specifications of the control, and wherein the power supply module supplies components of the adjustment head, including the data transmission module and the tool adjustment device, with electrical power, and wherein the data transmission module is arranged and intended for exchanging information concerning at least the adjustment of tool accommodated in the adjustment head with the base station of the measuring probe or bore gauge in the working space of the CNC machine.

Since only one (stationary) base station is required for the at least one adjustment head on the one hand and the measuring probe(s) on the other hand, this reduces the costs for acquisition, installation and operation of the overall arrangement. In this case, the base station is set up and intended to address, deactivate/activate the/each adjustment head, as well as the/each measuring probe or bore gauge in the working area of the CNC machine in response to corresponding commands from the control of the CNC machine, to address the/each adjustment head with adjustment tasks of its cutting edge/s, to receive corresponding feedback signals and to forward them to the control of the CNC machine, to address the/each measuring probe or bore plug gauge with measuring tasks, to receive—corresponding feedback signals and to forward them to the control of the CNC machine.

Variants, Advantages, Properties

In one variant of the adjustment head, the data transmission module and the base station are set up and intended to exchange the information concerning at least the adjustment of the tool accommodated in the adjustment head via a wireless bidirectional radio interface or a wireless bidirectional infrared interface.

In one variant of the adjustment head, only a first function module and a second—function module are provided, i.e. not three subassemblies but only two. Here, the division of the sub-assemblies (power supply, data transmission module, machining module, tool adjustment device . . . ) into the first and second function module follows the concept that the power and data transmission on the one hand and the machining on the other hand are to be clearly separated.

Since the two function modules are firmly and tightly connected (screwed together) but can be easily separated from each other, different modules can be combined in a very simple way. For example, the adjustment head can be easily configured with different energy supply (Ultracap plus inductive energy coupling or externally rechargeable batteries) and data transmission modules (infrared or radio), or other machining modules and different tool holders in the second function module.

In one variant of the adjustment head, the power supply module and the data transmission module have a section of integrated coolant channel for passing coolant to at least one machining point of the machining module. The two sections of the coolant channel in the power supply module and the data transmission module on the one hand and in the machining module on the other hand are connected to each other and guide the cooling lubricant from the inlet on the side of the power supply module or the data transmission module to the outlet assigned to the machining module. An integrated displacement measurement module is used to detect the displacement of the tool or its cutting edge/s in the machining module.

In one variant of the adjustment head, the machining module is set up to receive or form a spindle tool with adjustable adjustment of the tool or its cutting edge/s, which does not allow any change during machining operation. In a further variant of the adjustment head, the machining module is set up to allow adjustment of the tool or its cutting edge/s during machining of a workpiece. In a further variant of the adjustment head, the machining module is set up to receive or form a reaming tool with several cutting edges, which permits a finely adjustable adjustment of the tool or its cutting edge/s during machining. In a further variant of the adjustment head, the machining module is set up to receive or form a honing tool and is set up to adjust honing stones of the honing tool during machining and to signal data on a current diameter of the honing tool via the data transmission module to the control of the CNC machine in order to trigger or control termination of a honing process when a programmed production dimension is reached by the control.

In further variants of the adjustment head, one or more cutting edge positions of a tool located in the machining module can be changed electrically, for example by means of an electric motor or a piezo drive, or an adjustment of the tool or its cutting edge/s in the machining module can be effected hydraulically by means of a pressurised (cooling) fluid, whereby an adjustment of the tool or its cutting edge/s can be effected by the fluid (e.g. by a diaphragm or by a piston).

In the variant of hydraulic adjustment of the cutting edge positions, data transmitted from the control of the CNC machine to the data transmission module is used to control a fluid valve in order to effect an adjustment of the tool or its cutting edge/s, together with an integrated path measurement module, in accordance with the data from the control of the CNC machine during the cutting operation.

In further variants of the adjustment head, one or more sensors are provided in the machining module, set up and intended to detect operating parameters of one or more cutting edges of a tool located in the machining module, for example temperature, vibration, —condition of the tool cutting edges (the latter determined, for example, from a cutting force to be applied or an acoustically detected signature during the cutting process), etc., and to signal them via the data transmission module as a raw data signal or as a process status signal to the control of the CNC machine.

In the variant in which raw data signals are transmitted, they are processed and—evaluated in the control of the CNC machine. Sensor data processed and evaluated in the adjustment head (by a processor of the first function module, for example) is transmitted to the CNC machine control as a process status signal. For example, the sensor data is compared by the processor with limit values stored in the adjustment head and, if these are exceeded, a message or an error signal is transmitted to the control of the CNC machine. For example, if the cutting force suddenly increases, this indicates a damaged cutting edge. In a further embodiment, if the adjustment head is equipped with a honing tool, reaching the dimension stored in the adjustment head for the diameter to be honed could be signalled as a process status signal to the control of the CNC machine.

In further variants of the adjustment head, a turbine is provided in the energy supply module, which is to be set in rotation by means of a pressurised (cooling) fluid to be supplied to the adjustment head. The turbine is operationally coupled to a generator that supplies converted energy to a battery and/or capacitor for intermediate storage.

In further variants of the adjustment head, an interface module is provided cumulatively or alternatively to the data transmission module, which is intended and set up to detect and process one or more manual inputs by means of a contacting or non-contacting external transmitter in the form of an actuating pin, a light or (ultra) sound source, a permanent or electromagnet, or the like. or the like by means of a contacting or non-contacting external encoder in the form of an actuating pin, a light or (ultra) sound source, a permanent or electromagnet, or the like, in order to effect signalling to the machining module in the sense of a (fine) adjustment of one or more cutting edge positions of a tool located in the machining module, the assumption of a (retracted or extended) end position, a predefined nominal position, or the like.

In further variants of the adjustment head, the interface module has an optical (e.g. LED(-array), acoustic (beeper) and/or haptic (buzzer or vibrator) output unit for feedback of a successful input. The interface module is intended and set up to effect, depending on the respective input, different positioning sequences of a tool located in the processing module by corresponding control of the electric motor, piezo drive or fluid valve, an adjustment of the tool or its cutting edge/s in the processing module.

In further variants of the adjustment head, the data transmission module and the interface module are set up and intended to receive an activation and/or response of the adjustment head with data exchange in order to optionally effect a manual adjustment or an adjustment of a tool located in the processing module, which is specified via a wireless data connection.

Furthermore, a method for adjustment the tool or its cutting edge/s in the machining module of an adjustment head is described here, whereby during chip-removing machining of a workpiece by means of a tool located in the machining module, any wear occurring on the cutting edge/s of the tool is offset against tool data of the tool located in the machining module that is available in the CNC control, and the CNC control then compensates for the wear occurring on the cutting edge/s of the tool during machining of the workpiece by correspondingly correcting the position of the cutting edge/s of the tool.

The adjustment of the cutting edge/s of the tool is not calculated and effected by an external measuring computer but by a function of the machine control itself. At the same time, not every possible adjustment is carried out, but only the necessary/possible adjustment depending on the tool data of the control. The correction values can be transferred to the adjustment head from the direct measurement or from a downstream measurement of the workpiece, or by manual input into the machine control.

Here, correction values are to be introduced into the machining process by direct manual input into the adjustment head, whereas in known systems only input via an external measuring computer is possible. Direct determination of the deviation between the nominal and actual values in the CNC control is also not possible in known systems.

In further variants of the method for adjustment the tool or its cutting edge/s in the machining module of an adjustment head, a zero position and a current position of the cutting edge/s of the tool are stored in a data memory of the adjustment head, and in a teach-in step, the information "zero position" and "current position" or "actual position" of the cutting edge/s of the tool stored in the adjustment head is transmitted to the CNC control by the data transmission module. This makes the adjustment head very easy to use in different machining centres or other CNC machines.

With the procedure and the adjustment head presented here, an automatic correction of the wear of tool cutting edges is simplified. The procedure presented here results in an automatic adjustment of the cutting edge. In contrast, the previous procedure is based on a measuring computer calculating a correction value from coordinate values transmitted by the CNC machine. The calculated correction value is transmitted to an additional control unit in order to trigger a corresponding adjustment of the tool. This control unit is unnecessary with the procedure presented here.

The control loop is closed by the targeted generation of the actual dimension by a measuring device in the machining centre and a correction of the tool set by the machine depending on the control parameters in order to achieve the target dimension for the next machining operation.

At the same time, the maximum adjustment of the cutting edges can also provide information about the necessity of a cutting edge exchange. The adjustment head signals that the adjustment is no longer possible, or the control determines the previous adjusted value depending on the zero position and the actual position and signals that a cutting edge exchange is necessary.

The method presented here compensates for wear on a cutting edge of the tool by correcting the infeed. For example, in machining operations (milling, turning, etc.), the wear can be offset against the tool data to compensate for the wear. For drilling and boring tools, the wear can be compensated by adjustment the cutting edge. The method proposed here provides for the adjustment of the cutting edge of the adjustment head to be carried out directly on the machine control itself. The adjustment head includes a memory unit for the zero position and the current position.

An external measuring computer, which used to be necessary and which corrects the position to be corrected depending on the variables from the machine control, is thus no longer required. The measuring computer is not interchangeable between different machining centres. Because the solution presented here no longer requires a measuring computer, the system can be easily operated on several machines, and by storing the actual and zero position, each machine knows the values of the adjustment head.

The method presented here for adjustment the tool or its cutting edge/s in the machining module of an adjustment head provides that an actual dimension on the workpiece is detected by means of a sensing or measuring head, and a correction value is determined in the CNC control on the basis of the actual dimension and a deviation determined from the nominal dimension of the workpiece, which is provided to the adjustment head. An adjustment of the tool or its cutting edge/s is triggered by corresponding control of an actuator in the tool, whereby the correction value communicates to the adjustment head via a data link. Preferably, the correction value is also stored in the data memory of the adjustment head.

The method and the adjustment head presented here allow the calculation of the correction value by the CNC control and the subsequent storage of the information "zero position" and "current position" of the cutting edge/s of the tool in the adjustment head. This allows a reduction in cycle time during machining, higher dimensional accuracy and less integration effort.

For example, DE 102 62 188 A1 concerns a multidirectional measuring probe with a housing in which an annular support bearing is formed that defines an X, Y bearing plane—and a central axis Z of the measuring probe that is normal thereto. A stylus receptacle is—centrally arranged on a support body to receive a stylus. A transmission element is—displaceably guided in the housing along the central axis Z in order to convert any deflections of the support body from its rest position into straight-line movements. A sensor converts the movements of the transmission element into measuring signals. The transmission of the measuring signals from a measuring probe to a stationary base station takes place wirelessly either by optical (e.g. infrared) signals or by radio signals. Usually, in a machining centre, measuring probes communicating with the stationary base station are also provided in accordance with the number of spindles, which can be inserted into the respective spindle for workpiece measurement, whereby in newer designs workpieces machined simultaneously in a measuring sequence can also be measured simultaneously.

Instead of handling the data communication between the adjustment head presented here and the CNC control or the measuring PC via separate infrared or Bluetooth® transmit/receive modules in the fine adjustment head and in the machine room, the adjustment head presented here is modularised in such a way that it has a data transmission module that corresponds to that of the measuring probe. In this way, the data communication of the adjustment head presented here can also take place via the wireless light or radio link base station already present in the machine room.

For this purpose, in one variant the adjustment head is equipped with a light or radio connection module such as a measuring probe or bore gauge. In the same way, in one variant, the adjustment head is equipped with a power supply module corresponding to the power supply module of the measuring probe or bore gauge. This design of the adjustment head presented here enables multiple use of the available resources (wireless light or radio link base station provided in the machine room for communication of the measuring probe(s) with the CNC control).

Also, the proportion of common parts in the adjustment head and the measuring probe or bore gauge (light or radio connection module, power supply module, displacement measuring system, etc.) can increase. This reduces the stock-keeping and the acquisition and maintenance costs. Since the light or radio link base station in the machine tool is used equally during operation for a measuring probe and/or bore measuring head on the one hand and the adjustment head on the other, an efficient and precise machining process can be realised in this constellation with comparatively low investment costs and reduced installation effort. This constellation is also suitable for lower-cost machining centres and retrofits.

In use, the adjustment head is also more precise in that the integrated displacement measuring module and its measuring and evaluation electronics for direct displacement measurement are relocated to the inside of the integrated displacement measuring module, taking into account the special features of operation on fast-turning machine tools. In particular, with rotating parts, it must be ensured that the acceleration and centrifugal forces acting on the parts compensate each other so that no speed-dependent errors are obtained in the length measurement.

The modular design of the power supply, data transmission and integrated displacement measurement module can be used in a versatile and cost-effective manner compatible with various processing modules of the adjustment head. In one variant of the adjustment head, the power supply and/or data transmission module and/or the respective processing module are statically and/or dynamically balanced in that the respective module is designed to be unbalanced and readjusted in one, two or more planes. This means that the individual modules can be combined as desired in order to configure the adjustment head according to customer requirements.

Also disclosed herein is a CNC machine having a machining space. The CNC machine is arranged and intended to machine a workpiece with at least one tool received in a spindle of the CNC machine. The spindle and the workpiece are movable relative to each other, controlled by a CNC controller. The spindle or one of the spindles is also designed and intended to receive a measuring probe. The measuring probe is designed and intended for contact or non-contact scanning of the workpiece and for wireless output of corresponding measuring signals for communication between the measuring probe and a base station connected to a control of the CNC machine or a control computer. The or one of the spindles is also set up and intended to receive an adjustment head as a tool for machining the workpiece, which is also designed and intended for wireless communication with the base station. The adjustment head preferably has one or more of the features explained above.

Also disclosed here is a base station for use in a machine room of a CNC machine. The base station is connected to a control of the CNC machine or a control computer. The CNC machine is adapted and designed to machine a workpiece with at least one tool received in a spindle of the CNC machine. The or one of the spindles is also arranged and intended to receive a measuring probe which is arranged and intended to scan the workpiece in a contacting or non-contacting manner and to output corresponding measuring signals to the base station in a wireless manner. The or one of the spindles is also designed and intended to receive an adjustment head as a tool for machining the workpiece. It is also intended and set up for wireless communication with the base station. The adjustment head preferably has one or more of the features explained above.

The power supply module and/or the data transmission module of the adjustment head/measuring probe are versatile and enable the tool manufacturer to produce different actuator or intelligent tools at low cost.

For initialising/(in)activating each of the measuring probes/adjustment heads, it is provided according to a variant that an activation signal is sent to the respective measuring probe/adjustment head before the actual information is sent out, and an inactivation signal is sent after the actual information has been sent out.

According to one variant, each of the measuring probes/adjustment heads can be activated by means of a dedicated activation signal for the respective measuring probe/adjustment head. According to another variant, each of the measuring probes/adjustment heads can be activated by means of a common activation signal for all measuring probes/adjustment heads assigned to a single base station.

Depending on the system architecture and control concept of the machining centre, the or each of the activation signals can be transmitted either by the receiving part and/or by the numerical control of the machining centre, for example also by an additional participant or the control of the CNC machine via the receiver.

According to one variant, the measuring probes/adjustment heads can transmit their data telegrams to the single base station at predetermined time intervals after they have been activated. According to one variant, in particular in the operating mode "normal operation", the/each measuring probe/adjustment head monitors the single base station as to whether there is continuous communication and/or whether the state "battery of the measuring probe/adjustment head is good" has changed to "battery of the measuring probe/adjustment head is empty". If this is the case, according to a variant, it can be provided that a warning signal characteristic for this is emitted by the base station.

Furthermore, according to a variant, it can be provided that the transmission time of the data telegrams is at least approximately identical for all data telegrams of all measuring probes.

Finally, a base station is also presented here for exchanging information with measuring probes/adjustment heads to be recorded together in a machining centre. The base station is set up to determine whether a respective data telegram has been received from a measuring probe/adjustment head and then to forward this to the control.

BRIEF DESCRIPTION OF THE DRAWINGS

Further objectives, features, advantages and possible applications result from the following description of some embodiments and associated drawings. In this context, all the features described and/or illustrated constitute the object disclosed here, either individually or in any combination, also irrespective of their combination in the description or the drawings, or their grouping in the claims or their references.

FIG. 1a, 1b schematically illustrate a working space of a CNC machine with a measuring probe and an adjustment head, which are both accommodated one after the other in the same spindle of the CNC machine.

FIG. 1c schematically illustrates a working space of a CNC machine with a measuring probe and an adjustment head, both of which are simultaneously accommodated in different spindles of the CNC machine.

FIG. 2 schematically illustrates a variant of an adjustment head of FIG. 1.

DETAILED DESCRIPTION OF THE DRAWING

FIG. 1a, 1b schematically illustrate a machining centre in the form of a CNC machine 110 with a working or machining space 112 in which a spindle 114 is machining (milling, drilling or the like) a clamped workpiece WS during operation of the machining centre. The machining centre has a CNC control 140. Here, the spindle 114 is movable and drivable in three orthogonal directions X, Y, Z within the machine space 112 of the machining centre—relative to the workpiece WS. In a machining centre with one spindle, work can be performed on the workpiece WS as shown here and measured in alternation. In the situation shown here, a measuring probe 120 and an adjustment head 100 are alternately inserted into the spindle 114 by an automatic tool changer, which is not further illustrated, and are prompted by the CNC control 140, in order to measure or machine the machined workpiece WS.

The measuring probe 120 shown here functions by contact; it detects a (workpiece) surface when it comes into contact with it. For each detected feature, the tactile probe 120 emits corresponding measuring signals. Such a tactile probe of the applicant is disclosed, for example, in DE 102 62 188 A1, the contents of which are referred to here. Communication between the measuring probe 120 and a base station 130 arranged in the engine room 112 takes place wirelessly either by optical signals or by radio signals. Measuring signals are output from the measuring probe 120 to the base station 130, and control commands are output from the base station 130 to the measuring probe 120.

FIG. 1*c* schematically illustrates a machining centre in the form of a CNC machine 110 with a working or machining space 112 in which two spindles 114, 116 are machining (milling, drilling, or the like) a clamped workpiece WS during operation of the machining centre. The machining centre has a CNC control 140. The two spindles 114, 116 are here movable and drivable in three orthogonal directions X, Y, Z within the machining space 112 of the machining centre relative to the workpiece WS. In a machining centre with two spindles, for example, two workpieces can be machined simultaneously, or both spindles can work on the workpiece WS simultaneously, as shown here. In the situation shown here, a measuring probe 120 and an adjustment head 100 have already been inserted into the respective spindle 116, 114 by an automatic tool changer, which is not shown further, and which is initiated by the CNC control 140, in order to measure or machine the machined workpiece WS.

The measuring probe 120 shown here also functions by contact; it corresponds to the measuring probe from FIG. 1*b*.

Details of the procedure for signal transmission between the one, here illustrated, or here not further illustrated, several measuring probe(s) 120 and the stationary base station 130 are also disclosed in a variant in DE 10 2013 008 182 A1 of the applicant, the contents of which are referred to here. With the signal transmission procedure described there, it is possible for several components to use the same wireless transmission channel. If the transmission channel is an (infrared) light path, the measuring probes 120 use light signals of the same wavelength and modulation schemes. If the transmission channel is a radio link, for example in an ISM band (e.g. 2.4 GHz), the measuring probes 120 use the same carrier frequencies and modulation schemes. This makes it possible for the measuring probes 120 to communicate with one and the same stationary base station 130 via the transmission channel.

As explained above, a workpiece WS is to be machined with the CNC machine 110, more precisely with a tool received in a spindle 114 of the CNC machine. The spindle 114 and the workpiece are movable relative to each other, controlled by a CNC control 140. The or one of the spindles 114, 116 may also receive a probe 120. The probe 120 illustrated in FIG. 1 is used to contact-sense the workpiece WS and to wirelessly output corresponding measurement signals for communication between the probe 120 and the base station 130 connected to the controller 140 of the CNC machine 110. The or one of the spindles 114, 116 accommodates an adjustment head 100 as a tool for machining the workpiece WS. This adjustment head 100, or other adjustment heads 100 not illustrated here, is also intended and arranged for wireless communication with the base station 130. The adjustment head 100 preferably has one or more of the features explained below.

The base station 130 is connected to a controller 140 of the CNC machine 110 or a control computer. The base station 130 is used to communicate with at least one probe 120 received in a spindle 114, 116 of the CNC machine 110 and to communicate alternately or (quasi-)simultaneously with an adjustment head 100 also received in a spindle 114, 116 of the CNC machine 110.

The adjustment head 100 illustrated schematically in FIG. 1 in a situation of use comprises, as illustrated in more detail in FIG. 2, a roughly circular-cylindrical base body which is divided into a first function module 150 and a second function module 160, the first function module 150 being divided into a power supply module 152 and a data transmission module 154. The second function module 160 has a machining module 162 for receiving at least one tool. The machining module 162 has a tool adjustment device 164 for adjustment the tool in a radial direction based on inputs from the CNC controller. The power supply module has batteries 158, and supplies electrical power to components of the adjustment head 100, i.e., the data transfer module 154, the tool adjustment device 164, and other components of the adjustment head 100 described in further detail below.

The data communication module 154 is capable of, programmed for, and arranged to exchange information regarding at least the movement of tooling received in the adjustment head with the base station 130 of the probe 120 or a bore gauge in the working space 121 of the CNC machine 110 with the controller 140 of the CNC machine 110. In other words, both the adjustment head 100 and the measuring probe 120 or a bore plug gauge (not shown in more detail) in the working space 121 of the CNC machine 110 communicate bidirectionally with the control 140 of the CNC machine 110 via the base station 130. For this purpose, the adjustment head 100 uses infrared transmitter/receiver diodes 182 evenly distributed along the circumference of the data transmission module 154, via which the data transmission module 154 communicates with corresponding infrared transmitter/receiver diodes of the base station 130. Thus, the wireless bidirectional infrared interface 180*b* is implemented. This is implemented by wireless bidirectional radio interface 180*a* in another variant not shown.

More specifically, the data transmission module 154 of the adjustment head 100 sends to the base station 130, and through it to the control 140 of the CNC machine 110, the information concerning, among other things, the adjustment of the tool 170 housed in the adjustment head 100 via the wireless bidirectional infrared interface 180*b* shown in Figs. In addition, the data transmission module 154 of the adjustment head 100 receives information or commands (path/angle information for one/all cutting edges of the tool 170) for adjustment the tool 170 accommodated in the adjustment head 100 from the control 140 of the CNC machine 110 via the base station 130.

In one variation of the adjustment head, the power supply module 152 and the data transmission module 154 have a first section of an integrated coolant channel 155 for passing coolant, and the machining module 162 has a second section of an integrated coolant channel 165 leading to at least one machining location of the machining module 162. An integrated displacement measurement module 200 in the machining module 162 is used to detect the displacement of the tool 170 in the machining module 162.

As illustrated in FIG. 2, the cutting position of a tool 170 located in the machining module 162 can be changed electrically, in this case by means of a piezo drive 210. The extent of the change is determined by a command from the CNC control 140, which is transmitted via the base station 130 and the wireless bidirectional infrared interface 180*b* to the data transmission module 154 of the adjustment head 100. There, the command is converted into corresponding control signals for the piezo drive 210, resulting in the adjustment of the alignment of the cutting edges 170*a*, 170*b*. The integrated displacement measurement module 200 in the machining module 162 detects the adjustment of the tool 170 in the machining module 162 and signals the corresponding values through the data transmission module 154 of the adjustment head 100 via the wireless bidirectional infrared interface 180*b* back to the CNC control 140 via the base station 130.

In a variant not further illustrated, the tool or its cutting edge/s in the machining module 162 is adjusted hydraulically by means of a pressurised cooling fluid. The fluid can be used indirectly or directly to adjust the tool 170 or its cutting edge/s 170*a*, 170*b*.

The integrated displacement measurement module 200 in the machining module 162 performs its measurements on the position of the cutting edges or the tool. For particularly precise control of the geometry of the cutting edges, the condition of the cutting edges and other machining parameters, one or more sensors for detecting operating parameters of the cutting edge/s of the tool 170 located in the machining module 162 may be provided in addition to or instead of the integrated displacement measurement module 200 in the machining module 162. These include sensors 212 for sensing temperature, vibration, condition of the cutting edge of the tool, for example by sensing the required cutting force/forces. The data transmission module 154 receives the signals from these sensors 212 and sends them as raw data signals or as process status signals through the data transmission module 154 of the adjustment head 100 via the bidirectional infrared interface 180*b* to the CNC control 140 via the base station 130.

In variants of the adjustment head 100 according to FIGS. 1 and 2, an interface module 240 is provided cumulatively to the data transmission module 154 in order to detect and process manual inputs provided by an external encoder in the form of a magnetic actuation pin MAG with several sensors, for example in the form of contact points 240*a* . . . *d*. Based on these inputs, a signal is sent to the machining module 162 in the sense of a (fine) adjustment of the cutting edge/s of the tool 170 located in the machining module 162, the assumption of a (retracted or extended) end position, a predefined set position stored in a data memory of the adjustment head 100, or the like. In the variant shown, several contact points 240*a* d are provided, each of which triggers the execution of a predefined command when the magnetic actuation pin MAG approaches. These commands can be sent from the CNC control 140 via the base station 130 to the data transmission module 154 of the adjustment head 100. There they are stored in the data memory. Alternatively or additionally, when the magnet actuating pin MAG approaches the respective one of the contact points 240*a* . . . *d*, corresponding functions can be executed or values, e.g. positioning positions of the tool 170 or its cutter(s) 170*a*, 170*b* can be called or changed. These respective executed functions or values are also output on a display 244.

Thus, depending on the selected sequence of the respective contact points 240*a* . . . *d*, different positioning sequences can be started, for example, in order to manually approach a target position of the tool 170 or its cutting edge/s 170*a*, 170*b*. Ultimately, with the aid of the interface module, different positioning sequences of a tool or its cutting edge/s 170*a*, 170*b* located in the processing module can be effected according to the respective manual input, independently of or in addition to the control by the wireless bidirectional radio or infrared interface 180 via the base station 130 by corresponding control of the actuator (electric motor, piezo drive or fluid valve).

These manually activatable functions can also be performed on the adjustment head 100 in the CNC machine by wireless transmission of a corresponding correction value. For example, if the activation of the adjustment head 100 by a magnetic pin MAG is detected at the corresponding contact point 240*a* . . . *d*, the adjustment head 100 is activated. However, the wireless bidirectional radio or infrared interface 180 remains deactivated. Through the contactless interaction with the magnetic pin MAG, the desired target position of the tool 170 or its cutting edge/s 170*a*, 170*b* can be approached.

The adjustment head 100 presented here is a battery-operated motorised adjustable fine adjustment head which allows both manual adjustment and adjustment of the tool 170 or its cutting edge/s 170*a*, 170*b* specified via a wireless data link.

This makes presetting devices with additional hardware superfluous. This eliminates acquisition, follow-up and maintenance costs.

In the case of the adjustment head 100 shown here, the interface module has an LED(-array) as an output unit for feedback of a completed input.

In order to adjust the tool 170 or its cutting edge/s 170*a*, *b* in the machining module of the adjustment head, wear of the cutting edge/s of the tool occurring during machining of a workpiece by means of the adjustment head 100 is calculated with tool data of the tool located in the machining module available in the CNC control. The method for automatic correction of the cutting edge wear provides that the deviation from the nominal dimension of the machined workpiece determined by a measuring probe (or a measuring head) causes an adjustment of the cutting edge/s of the tool 170 by providing a correction value determined on the CNC control to the adjustment head. In this way, further machining leads to dimensional accuracy of the workpiece. The correction value is communicated to the adjustment head via a data link. The CNC control calculates the correction value, which is then communicated to the adjustment head and stored there in the memory. Measuring and correcting does not necessarily have to take place during the machining of one and the same workpiece. In series production, a workpiece dimension is thus kept within very narrow tolerance limits even for identical workpieces produced one after the other.

The CNC control then compensates for wear of the cutting edge/s of the tool occurring during machining of the workpiece by correcting the position of the cutting edge/s of the tool accordingly. For this purpose, corresponding commands are sent from the CNC control 140 to the adjustment head 100 via the wireless interface 130, and the latter supplies measurement data to the CNC control 140 in the opposite direction.

To adjust the tool or its cutting edge/s in the machining module of the adjustment head 100, a zero position and a current position of the cutting edge/s of the tool are stored in a data memory of the adjustment head. During a teach-in step, the information "zero position" and "current position of the cutting edge/s of the tool" stored in the data memory of the adjustment head 100 are transmitted to the CNC control by the data transmission module.

The variants of the method and the device described above are merely intended to provide a better understanding of the structure, the mode of operation and the properties of the solution presented; they do not limit the disclosure to the variants. The Figs. are schematic, with essential features and effects shown, in some cases significantly enlarged, to illustrate the functions, operating principles, technical embodiments and features. In this context, any mode of operation, principle, technical design and feature(s) disclosed in the Fig. or in the text may be freely and arbitrarily combined with all claims, any feature in the text and in the other Fig., other modes of operation, principles, technical designs and features contained in or resulting from this disclosure, so that all conceivable combinations are to be attributed to the described solution. Combinations between all individual embodiments in the text, i.e. in each section of the description, in the claims and also combinations between different variants in the text, in the claims and in the Figs. are also included.

The device and process details explained above are shown in context; however, they can also be used independently of each other and freely combined with each other. The relationships of the individual parts and sections thereof to each other and their dimensions and proportions shown in Fig. are not to be understood as restrictive. Rather, individual dimensions and proportions may also deviate from those shown.

The claims also do not limit the disclosure and thus the possible combinations of all the features disclosed. All the features disclosed are also explicitly disclosed here individually and in combination with all the other features.

The invention claimed is:

1. An adjustment head intended and arranged for use in a working space of a CNC machine having a base station arranged and intended for information exchange with a measuring probe or bore gauge connected to a control of the CNC machine, the adjustment head comprising:

a first function module and a second function module, the first function module being divided into a power supply module and a data transmission module, wherein the power supply module and the data transmission module have an integrated coolant duct for passing coolant to at least one machining point of the machining module, the second function module comprising, a machining module for receiving at least one tool, the machining module comprising a tool adjustment device for adjustment the tool or its cutting edge/s in a radial and/or an axial direction and/or in an angular orientation of the tool-based on instructions from the controller, wherein the first function module includes a first section of the integrated coolant duct and the second function module includes a second section of the integrated coolant duct, wherein the power supply module supplies electrical power to components of the adjustment head, including the data transmission module and the tool adjustment device, and wherein the data transmission module is arranged and intended for exchanging information concerning at least the adjustment of the tool accommodated in the adjustment head with the base station of the measuring probe or bore gauge in the working space of the CNC machine.

2. The adjustment head according to claim 1, wherein the data transmission module of the adjustment head and the base station are arranged and intended to exchange the information concerning at least the adjustment of the tool received in the adjustment head via a wireless bidirectional radio interface or a wireless bidirectional infrared interface.

3. The adjustment head according to claim 1 further comprising an integrated displacement measurement module for detecting the displacement of the tool in the machining module.

4. The adjustment head according to claim 1, wherein the machining module is adapted to receive a spindle tool with adjustable adjustment of the tool or its cutting edge/s, which does not allow any change during machining operation, or the machining module allows for an adjustment of the tool or its cutting edge/s during machining, or the machining module is adapted to receive a reaming tool having a plurality of cutting edges, allowing a finely adjustable adjustment of the tool or its cutting edge/s during machining, or the machining module is adapted to receive a honing tool and is adapted to adjust the honing tool during machining, the machining module is adapted to receive a honing tool and is adapted to adjust honing stones of the honing tool during machining and to signal data on a current diameter of the honing tool via the data transmission module to the control of the CNC machine so as to trigger termination of a honing process by the control when a programmed production dimension is reached.

5. The adjustment head according to claim 1, in which an adjustment of the tool or its cutting edge/s in the machining module is to be effected electrically by an electric motor or a piezo drive, or an adjustment of the tool or its cutting edge/s in the machining module is to be effected hydraulically by means of a pressurised cooling fluid, wherein an adjustment of the tool or its cutting edge/s is to be effected by the fluid.

6. The adjustment head according to claim 1, wherein in a variant of hydraulic adjustment of the tool or its cutting edge/s data transmitted from the control of the CNC machine to the data transmission module serves to control a fluid valve in order to effect, together with an integrated displacement measurement module, an adjustment of the tool or its cutting edge/s in accordance with the data from the control of the CNC machine during the cutting operation.

7. The adjustment head according to claim 1, wherein the data transmission module is arranged and intended to signal raw data signals or process status signals from the adjustment head to the control of the CNC machine.

8. The adjustment head according to claim 1, in which at least one sensor is provided in the machining module, adapted and intended to detect operating parameters of one or more cutting edges of a tool located in the machining module via temperature, vibration, tool cutting condition or cutting force of the tool or its cutting edge/s, and to signal them via the data transmission module as a raw data signal or as a process status signal to the control of the CNC machine.

9. The adjustment head according to claim 1, wherein a turbine is provided in the power supply module, which is to be set in rotation by means of a pressurised fluid, wherein the turbine is operatively coupled to a generator, which supplies converted energy to a battery and/or capacitor for intermediate storage.

10. The adjustment head according to claim 1, in which cumulatively or alternatively to the data transmission module, an interface module is provided which is intended and set up to detect and process one or more manual inputs by means of a contacting or non-contacting external transmitter in the form of an actuating pin, a light or ultra sound source, a permanent or electromagnet, or the like, in order to effect a signalling to the machining module in the sense of a fine adjustment of the tool or its cutting edge/s, the assumption of a retracted or extended end position, a predefined nominal position, or the like.

11. The adjustment head according to claim 1, in which an interface module has an optical, acoustic and/or haptic output unit for feedback of an input that has been made, and is intended and set up for triggering different positioning sequences of a tool located in the processing module or of its cutting edge/s depending on the respective input by corresponding control of an actuator in the form of an electric motor, piezo drive, fluid valve or the like to trigger an adjustment of the located tool or its cutting edge/s.

12. The adjustment head according to claim 1, wherein the data transmission module and an interface module are arranged and intended to receive an activation and/or message of the adjustment head for selectively effecting a manual adjustment or an adjustment predetermined via a wireless data link of a tool or its cutting edge/s located in the machining module.

13. The adjustment head according to claim 1, wherein the second function module can be detached from the first function module and replaced with a different machining module.

* * * * *